US007280117B2

(12) United States Patent
Fayan

(10) Patent No.: US 7,280,117 B2
(45) Date of Patent: Oct. 9, 2007

(54) GRAPHICAL USER INTERFACE FOR A KEYER

(75) Inventor: Randy M. Fayan, Medford, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 11/112,321

(22) Filed: Apr. 22, 2005

(65) Prior Publication Data

US 2006/0055708 A1 Mar. 16, 2006

Related U.S. Application Data

(63) Continuation of application No. 10/939,042, filed on Sep. 10, 2004, now abandoned.

(51) Int. Cl.
*G09G 5/02* (2006.01)
(52) U.S. Cl. ..................... 345/592; 345/594; 382/162
(58) Field of Classification Search ............... None
See application file for complete search history.

(56) References Cited

U.S. PATENT DOCUMENTS

| 6,226,010 | B1 * | 5/2001 | Long ......................... 345/594 |
| 6,927,784 | B2 * | 8/2005 | Matsuda et al. ............. 345/690 |
| 7,030,885 | B2 * | 4/2006 | Kim et al. .................. 345/589 |
| 2001/0028735 | A1 | 10/2001 | Pettigrew et al. |
| 2004/0004626 | A1 * | 1/2004 | Ida et al. .................... 345/626 |
| 2005/0219259 | A1 * | 10/2005 | Gonsalves et al. .......... 345/593 |

FOREIGN PATENT DOCUMENTS

JP 11-027693 1/1999

OTHER PUBLICATIONS

Cardini, "Creating and Using Mattes for Video Compositing", Apr. 2001, Buena Software Inc, pp. 1-7.*
Utimatte Advantedge v. 15 User's Guide, Online, Sep. 5, 2004, pp. 1-74.

* cited by examiner

*Primary Examiner*—Mark Zimmerman
*Assistant Examiner*—Kevin Xu
(74) *Attorney, Agent, or Firm*—Peter J. Gordon

(57) ABSTRACT

A keyer is provided with a graphical user interface that helps a user visualize the relationship between the key and the image to be processed using that key. A color space swatch is processed by the keyer using the defined key. The output of the keyer as applied to the color space swatch is displayed to the user to illustrate which colors match the defined key. The alpha matte generated by applying the key to the color space swatch also may be displayed. Each pixel in either the color space swatch or the alpha matte generated by applying the key to the color space swatch may be modified to indicate whether its corresponding color is present in the input image or in the preprocessed input image. Luminance processing also may be applied. In particular, the alpha value for a pixel may be adjusted according to the luminance of the pixel according to a user defined function. The alpha matte displayed to the user may include the effects of such luminance processing. The keyer may preprocess the input image by modifying the saturation of each pixel using the luminance of the pixel. These displays may be interactively updated as the user modifies the definition of the key or the controls for preprocessing or luma processing.

20 Claims, 5 Drawing Sheets
(3 of 5 Drawing Sheet(s) Filed in Color)

GRAPHICAL USER INTERFACE FOR A KEYER

CROSS REFERENCE TO RELATED APPLICATION

This application is a continuation of prior application Ser. No. 10/939,042, filed Sep. 10, 2004, now abandoned and is incorporated herein by reference.

BACKGROUND

A chroma keyer processes an image, or a sequence of images for motion video, to identify pixels in the image within a particular range of colors. The range of colors is called the key. The closeness of the color of each pixel, defined either as chrominance or red, green and blue (RGB) values, determines an alpha value for that signal. The set of all alpha values for all the pixels in the image defines what is called an alpha matte. This alpha matte is then used to composite the image, usually a foreground image, with one or more other images, usually background images. Green screen and blue screen production techniques rely on such chroma key operations. Luma keyers also may be used to extract an alpha matte based on luminance instead of chrominance.

There are a variety of ways to define the key used by a chroma keyer or a luma keyer. A challenge in implementing any keyer is providing a way for an operator to understand how the key relates to the input image, and how changes to the key will change the resulting composited image.

SUMMARY

A keyer is provided with a graphical user interface that helps a user visualize the relationship between the key and the image being processed. For example, the user may benefit from visualizing what colors are within the key and what colors are present in the image to be processed.

In particular, a color space swatch is processed by the key to be applied to the image. The output of the keyer as applied to the color space swatch is displayed to the user. This output illustrates which colors match the defined key. The alpha matte generated by applying the key to the color space swatch also may be displayed. These displays may be interactively updated as the user modifies the definition of the key to permit visualization of the key.

These displays also may be modified to indicate what colors are present in the input image. Because each pixel in the color swatch, or the alpha matte generated from it, corresponds to a color, each pixel in either the color swatch or the alpha matte may be modified to indicate whether its corresponding color is present in the input image. As the display is interactively updated as the user modifies the definition of the key, the display permits visualization of the relationship of the key to colors in the input image.

The keyer also may preprocess the input image by modifying the saturation of each pixel. By generating the displays using the preprocessed image, the display may be interactively updated as the user modifies the controls of the preprocessing operation to permit visualization of how the preprocessing operation affects the input image and how that result relates to the key.

Another luminance processing also may be applied. In particular, the alpha value for a pixel may be adjusted according to the luminance of the pixel according to a user-defined function. The alpha matte displayed to the user may include the effects of such luminance processing. The display may be interactively updated as the user modifies the specified function to permit visualization of how the luminance processing affects the alpha matte.

BRIEF DESCRIPTION OF THE DRAWINGS

The patent or application file contains at least one drawing executed in color. Copies of this patent with color drawings will be provided by the Patent and Trademark Office upon request and payment of necessary fee.

DETAILED DESCRIPTION

Figure 1:
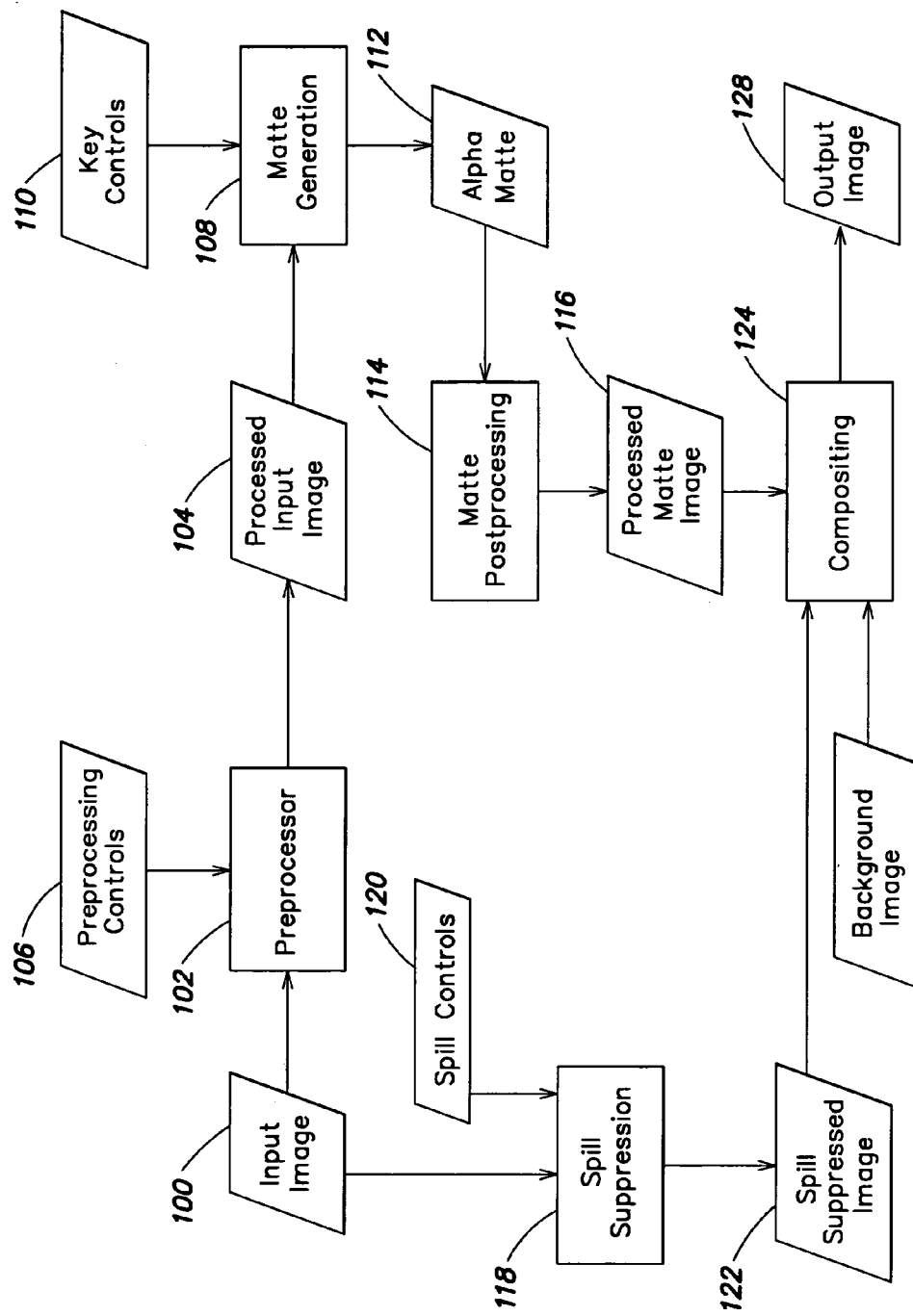
FIG. 1 is a data flow diagram that illustrates a chroma key operation.

FIG. 1 is a data flow diagram that illustrates a keyer. An input image 100 is the image to which a key is to be applied. A preprocessor 102 may be used to modify the input image according to preprocessing controls 106 to produce a preprocessed input image 104. The preprocessing controls may be specified by a user through an appropriate graphical user interface. The input image 100 may be preprocessed to improve the ability of the system to extract an alpha matte. An example kind of preprocessing involves modifying the saturation of pixels in the input image, and is described in more detail below.

The input image 100, or the preprocessed image 104 if preprocessing is used, is input to matte generation 108 which processes the image according to key controls 110 to produce an alpha matte 112. How the key controls are used to produce the alpha matte 112 depend on the implementation, and a variety of techniques are known for matte generation. In general, the alpha matte is an image that has a value, called alpha ($\alpha$), for each pixel, such that $0<=\alpha<=1$. In the example described herein the keyer is a chroma keyer. The key controls may be specified by a user through an appropriate graphical user interface.

The alpha matte 112 may be subjected to matte post-processing 114, such as blurring, eroding (blurring only the inside of the matte edge) or dilating (blurring only the outside of the matte edge), to produce a processed matte image 116. For example, a Gaussian blur may be applied to the alpha matte. Eroding or dilating may be simulated by multiplying the blurred matte by the original matte, or by the inverse of the original matte. The matte post-processing that may be performed depends on the implementation, and may have parameters that are specified by the user through an appropriate graphical user interface. The post-processed matte still has alpha values such that $0<=\alpha<=1$.

The original input image 100 also may be subjected to spill suppression 118 or other color correction operation. Spill suppression involves removing a color tint from an object in the image which may appear on the object due to reflection from a background. For example, the edges of objects in front of a green screen may have a green tint due to reflection from the green screen. Spill suppression involves identifying pixels of a color and replacing them with pixels of another color, using one of a variety of known techniques, based on spill controls 120. The spill controls may be specified by a user through an appropriate graphical user interface. Spill suppression supplies a spill suppressed image 122.

The original input image 100, or spill suppressed image 122 if spill suppression is used, is input to a compositor 124. The compositor 124 blends the image (100 or 122) with one or more other background images 126 according to either the alpha matte 112 or the processed matte image 116 if matte post-processing is used. The compositor also may perform various transformation operations on the image and the matte, such as scaling, cropping, repositioning, etc. The compositor provides the output image 128.

Having now described an example keyer, a graphical user interface for the keyer will now be described. The graphical user interface helps the user to visualize the relationship between the key and the image being processed. In particular an operator may benefit from visualizing what colors are within the key and what colors are present in the image to be processed.

Figure 2:
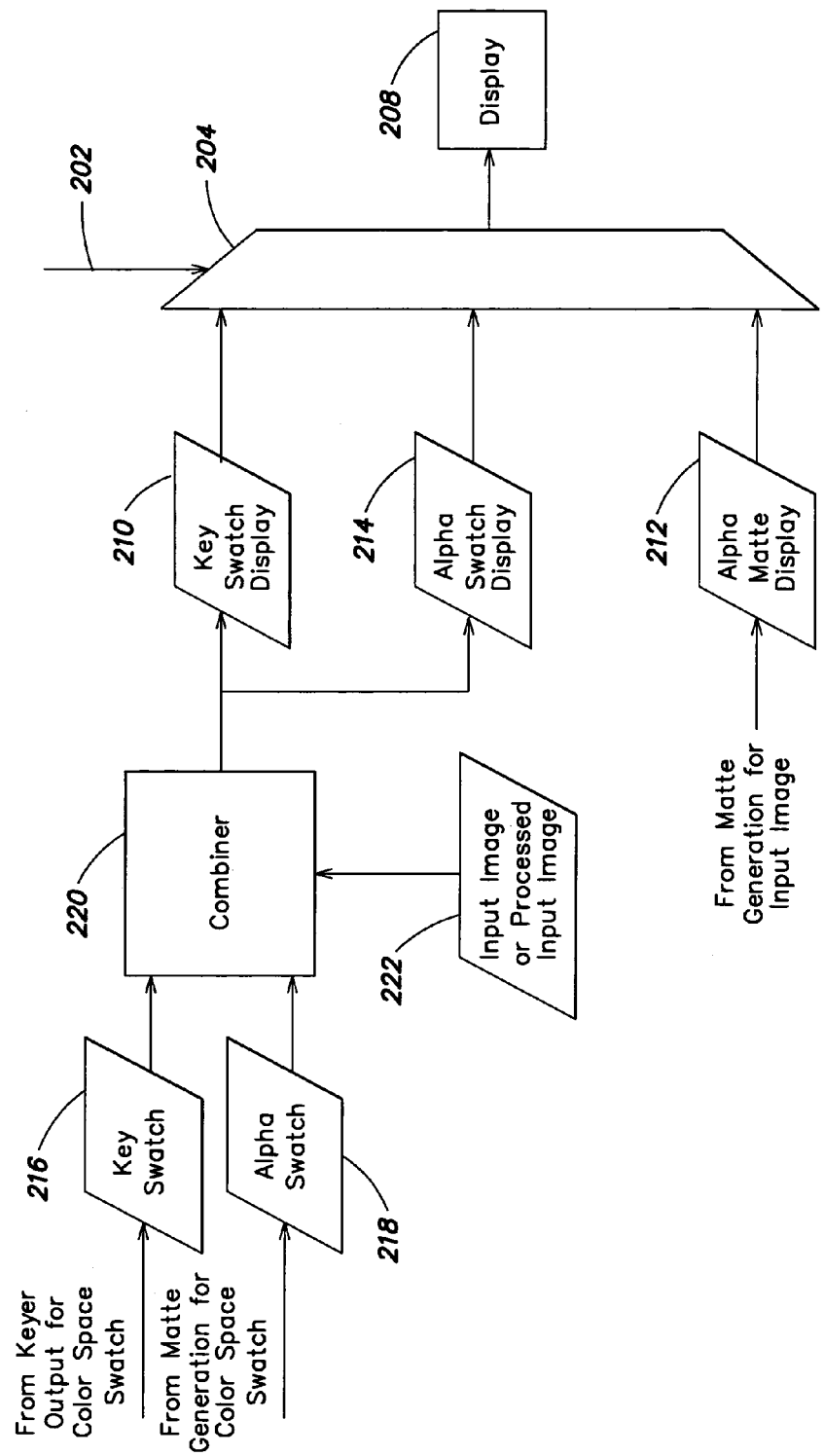
FIG. 2 is a data flow diagram that illustrates how a graphical user interface may be generated.

To this end, a graphical user interface is provided that displays images conveying this information. A data flow diagram illustrating how these images are generated will now be described in connection with FIG. 2. In particular, based on a user selection 202, a selector 204 provides an image to a display 208 to be viewed by the user. If enough display space is available, more than one of these images may be displayed at a time. The selected image or images also may be shown adjacent to the output image 128 from compositing 124 performed on an input image 100 (see FIG. 1). The user selection 202 may be provided through any appropriate user interface. The inputs to the selector 204 may include, for example, a key swatch display 210 (described below), an alpha swatch display 214 (described below) or an alpha matte display 212. The alpha matte display may be provided by either the alpha matte display 112 or the processed matte image 116 as shown in FIG. 1 as generated for the input image by the keyer. Other images, such as the output of the keyer as applied to the imput image, also may be displayed. These inputs to the selector may be updated interactively while the user modifies the various controls for the keyer.

The key swatch display 210 is generated by applying the defined key to a color swatch. A color space swatch is an image that represents the colors in a two-dimensional plane orthogonal to luminance in a color space. Each pixel in the color space swatch corresponds to a different color in that plane, according to the pixel's coordinates. For example, chrominance values (Cr and Cb in the YCrCb format or U and V values in a YUV format) may be represented by such a color plane. The color space swatch may be a circle (also called a color wheel), a square or may have some other shape. For example, the color space swatch may have an origin at the center that represents no saturation, and in which a color is represented by an angle (hue) and a magnitude representing a distance from the origin (saturation). An example color wheel or square has an angular gradient of varying hue, with red at 110 degrees, green at 230 degrees and blue at 350 degrees and has a radial gradient of varying saturation, with zero saturation in the center and full saturation at the edge.

By inputting the color space swatch to the keyer, an alpha matte is generated based on the defined key. The color space swatch is composited with a background, such as a black image, using the generated alpha matte. The output of the compositor is the key swatch 216. The alpha matte generated by applying the defined key to the color swatch image provides an alpha swatch 218. To generate the key swatch, the color space swatch is not preprocessed. However, the alpha matte may be post-processed and spill correction may be applied to the color space swatch. The key swatch output by the compositor may be displayed and updated interactively as the user modifies the key controls (110 in FIG. 1), spill controls (120 in FIG. 1) and any control for the matte post-processing (114 in FIG. 1).

The key swatch display 210 and the alpha swatch display 214 may be based directly on the key swatch 216 or the alpha swatch 218. Alternatively, the key swatch 216 and/or alpha swatch 218 also may be modified to include a representation of the input image. In particular, this representation of the input image indicates what colors are present in the input image. Because each pixel in the color swatch, or the alpha matte generated from it, corresponds to a color, each pixel in either the color swatch or the alpha matte may be modified to indicate whether its corresponding color is present in the input image. To generate this view, the key swatch and alpha swatch are input to a combiner 220. The combiner also receives either the input image or the preprocessed input image as indicated at 222. For each pixel in the input image, the position of its corresponding color in the key swatch or alpha swatch is identified. The pixel at this position in the key swatch or alpha swatch is set to a value that, when displayed, indicates that the color is present in the input image. For example, on the alpha swatch display, because the alpha matte is a gray scale, each color that is present in the input image may be displayed using that color. The combiner 220 outputs the key swatch display 210 or the alpha swatch display 214.

Figure 3:
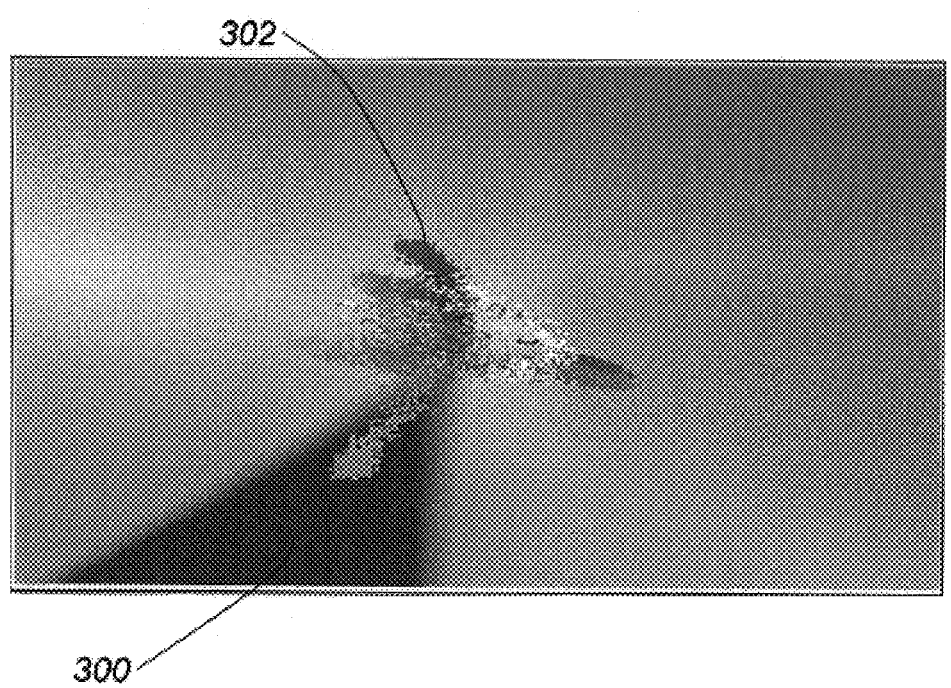
FIG. 3 is an example key swatch display with input image information overlay, shown in gray scale.
Figure 4:
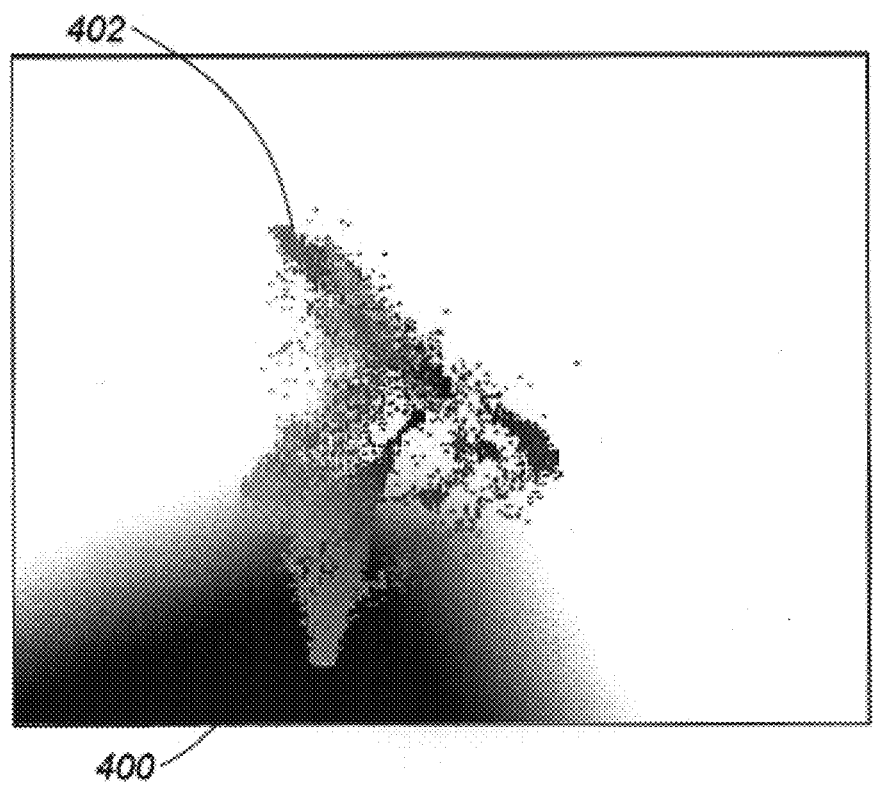
FIG. 4 is an example alpha swatch display with input image information overlay, shown in gray scale.

Referring now to FIGS. 3 and 4, examples of such key swatch displays and alpha swatch displays are shown, in gray scale. In FIG. 3, a dark region 300 indicates the colors that are extracted by the key. The scattergram-like object 302 indicates the colors that are present in the input image. Because each pixel in the key swatch is a color, the indication that the color is in the input image is provided by changing this color, for example by modifying its luminance, for example by setting its luminance to the luminance of the pixel from the input image. In FIG. 4, the dark region 400 also indicates the colors that are extracted by the key. The scattergram-like object 402 indicates the colors that are present in the input image. Each pixel of the scattergram-like object may be the color that is present in the input image. A black pixel, white pixel or a unique character placed on the pixel may be used as well.

Figure 5:
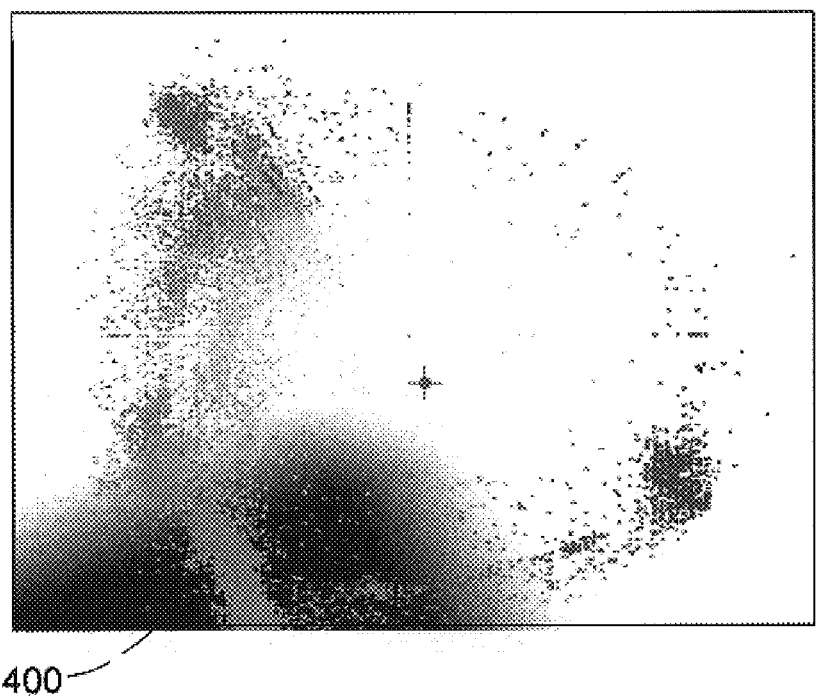
FIG. 5 is an example alpha swatch display with preprocessed input image information overlay, shown in gray scale.

As noted above, the key swatch display 210 and the alpha swatch display 214 may be modified to include a representation of the preprocessed input image instead of the input image. By using the preprocessed input image, the effect of the preprocessing controls on the ability to apply the key may be visualized. The key swatch display and the alpha swatch display as modified to include a representation of the preprocessed input image also may be interactively updated as the user changes the preprocessing controls. For example, as shown in FIG. 5, if the saturation of the pixels is increased, the result, as shown in the alpha swatch display, is an appearance of the pixels spreading out away from the origin.

Having now described the display images in the graphical user interface, additional optional luminance processing that may be applied to the chroma keying operation will now be described. First, the alpha matte may be modified according to the luminance of the pixels in the input image. Second, shadows may be suppressed by preprocessing the input image to modify each pixel according to the luminance of the pixel.

To modify the alpha matte, the alpha value corresponding to each pixel in the input image is modified according to the luminance of that pixel. This optional modification may be used to increase or decrease the transparency level of pixels based on whether the pixel is dark or bright. For example, very bright pixels may be keyed out more than darker pixels. This modification is applied only to pixels that are neither fully opaque nor fully transparent, i.e., for which the alpha value is greater than 0 but less than 1. In particular, a user may specify a function, for example by using one or more function curves, that maps luminance values to alpha offsets. The alpha offsets may range from −1.0 to 1.0. Such a function may be specified through a conventional graphical user interface, for example an interface for defining function curves. This function may be represented in a lookup table.

When such luminance processing is enabled, for each pixel, if the alpha value generated for the pixel is greater than 0 but less than 1, the luminance value for that pixel is applied to the lookup table to obtain the alpha offset. The sum of the alpha value and the alpha offset value is computed, and the result is clipped if necessary to 0 or 1. If the alpha value is 0 or 1 it is unchanged. The resulting alpha value for each pixel provides the processed matte image. The matte image resulting from luminance processing may be provided as the alpha display 212 in the user interface. In one embodiment, luminance processing, whether or not enabled for processing the input image, is not used to generate the key swatch display or alpha swatch display, i.e., it is not applied to the alpha matte generated for the color swatch. In another embodiment, such luminance processing could be used in the generation of the key swatch display. The alpha display 212 may be interactively updated to display the modified alpha matte as the user makes changes to the specified alpha offset function.

As noted above, another form of luminance processing involves shadow suppression by preprocessing the input image. In chroma keying operations it is common for a foreground object to cast a shadow on a background that is to be keyed out, thus making some pixels darker in the background. These pixels tend to have lower luminance and lower saturation. As a result, it is more difficult to ensure that a key can capture these pixels. To address this difficulty, an input image may be preprocessed by increasing the saturation of pixels that have low luminance by an amount that is more than the increase in saturation of pixels that have high luminance.

For example, the saturation may be increased by adding an offset to the saturation determined by a user-adjustable variable and the luminance of the pixel. In particular, a user-adjustable value (V) may be between 0 and 1 and may be defined through any appropriate user interface, such as a slider or text box. This value is multiplied by a function of the luminance Y, for example $f(Y)=1-Y$ (where $0<=Y<=1$), or other function that is inversely proportional to the luminance, to provide the product $V*f(Y)$. The chrominance values of the pixel are Cb and Cr where $-0.5<=Cb,Cr<=0.5$. The new chrominance values for the pixel (Cb' and Cr') are $Cb'=Cb+f(Y)*V*(Cb/sqrt(Cb*Cb+Cr*Cr))$, and $Cr'=Cr+f(Y)*V*(Cr/sqrt(Cb*Cb+Cr*Cr))$. The new chrominance values Cb' and Cr' remain bounded within the minimum and maximum values of Cb and Cr. The function of luminance used to increase the saturation may be user-adjustable through an appropriate graphical user interface, such as an input text box or slider representing the function f(Y).

The resulting preprocessed image becomes the input to the matte generation function. The original input image, in contrast, is applied to the spill correction and/or the compositor. Because the key swatch display, alpha swatch display and alpha display each may be generated using the preprocessed input image, these displays may be interactively updated as the user changes the preprocessing controls.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system also may include specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for providing information to a user about a key applied by a keyer to an input image, comprising:
    applying the key to a color space swatch to generate an alpha matte;
    compositing the color space swatch as a foreground image with a gray-scale image as a background image using the alpha matte to generate a key swatch image; and
    displaying the key swatch image to the user.

2. The method of claim 1, further comprising:
    superimposing on the key swatch image an indication of the colors present in the input image.

3. The method of claim 1, further comprising:
    preprocessing the input image; and
    superimposing on the key swatch image an indication of the colors present in the preprocessed input image.

4. The method of claim 1, further comprising:
    interactively updating the key swatch image as the user modifies the key.

5. The method of claim 3, further comprising:
    interactively updating the key swatch image as the user modifies controls defining the preprocessing of the input image.

6. A computer program product comprising:
    a computer readable medium;
    computer program instructions stored on the computer readable medium that, when processed by a computer, instruct the computer to perform a method for providing information to a user about a key applied by a keyer to an input image, comprising:
    applying the key to a color space swatch to generate an alpha matte;
    compositing the color space swatch as a foreground image with a black image as a background image using the alpha matte to generate a key swatch image; and
    displaying the key swatch image to the user.

7. The computer program product of claim 6, wherein the method further comprises:
    superimposing on the key swatch image an indication of the colors present in the input image.

8. The computer program product of claim 6, wherein the method further comprises:
    preprocessing the input image; and
    superimposing on the key swatch image an indication of the colors present in the preprocessed input image.

9. The computer program product of claim 6, wherein the method further comprises:
    interactively updating the key swatch image as the user modifies the key.

10. The computer program product of claim 8, wherein the method further comprises:
    interactively updating the key swatch image as the user modifies controls defining the preprocessing of the input image.

11. A method for providing information to a user about a key applied by a keyer to an input image, comprising:
    applying the key to a color space swatch to generate an alpha matte;
    displaying an alpha swatch image based on the alpha matte to the user.

12. The method of claim 11, further comprising:
    superimposing on the alpha swatch image an indication of the colors present in the input image.

13. The method of claim 11, further comprising:
    preprocessing the input image; and
    superimposing on the alpha swatch image an indication of the colors present in the preprocessed input image.

14. The method of claim 11, further comprising:
    interactively updating the alpha swatch image as the user modifies the key.

15. The method of claim 13, further comprising:
    interactively updating the alpha swatch image as the user modifies controls defining the preprocessing of the input image.

16. A computer program product comprising:
    a computer readable medium;
    computer program instructions stored on the computer readable medium that, when processed by a computer, instruct the computer to perform a method for providing information to a user about a key applied by a keyer to an input image, comprising:
    applying the key to a color space swatch to generate an alpha matte;
    displaying an alpha swatch image based on the alpha matte to the user.

17. The computer program product of claim 16, wherein the method further comprises:
    superimposing on the alpha swatch image an indication of the colors present in the input image.

18. The computer program product of claim 16, wherein the method further comprises:
    preprocessing the input image; and
    superimposing on the alpha swatch image an indication of the colors present in the preprocessed input image.

19. The computer program product of claim 16, wherein the method further comprises:
    interactively updating the alpha swatch image as the user modifies the key.

20. The computer program product of claim 18, wherein the method further comprises:
    interactively updating the alpha swatch image as the user modifies controls defining the preprocessing of the input image.

* * * * *